(12) United States Patent
Tanner (10) Patent No.: US 10,174,877 B2
(45) Date of Patent: *Jan. 8, 2019

(54) PIPE TOOL POSITIONING SYSTEM

(71) Applicant: Jeffrey M. Tanner, Zanesville, OH (US)

(72) Inventor: Jeffrey M. Tanner, Zanesville, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 15/384,565

(22) Filed: Dec. 20, 2016

(65) Prior Publication Data

US 2017/0102107 A1    Apr. 13, 2017

Related U.S. Application Data

(63) Continuation of application No. 14/461,067, filed on Aug. 15, 2014, now Pat. No. 9,541,230.

(51) Int. Cl.
*F15B 15/10* (2006.01)
*F16L 55/18* (2006.01)
*E03F 9/00* (2006.01)

(52) U.S. Cl.
CPC .............. *F16L 55/18* (2013.01); *E03F 9/002* (2013.01); *F15B 15/10* (2013.01); *F15B 2215/30* (2013.01)

(58) Field of Classification Search
CPC ............ F16L 55/18; F16L 55/44; B08B 9/055
See application file for complete search history.

(56) References Cited

U.S. PATENT DOCUMENTS

| 4,577,388 | A | * | 3/1986 | Wood | B23D 21/02 |
| | | | | | 166/55 |
| 4,646,787 | A | | 3/1987 | Rush | |
| 5,368,423 | A | * | 11/1994 | Hanna | B23C 3/00 |
| | | | | | 166/55.7 |
| 6,697,710 | B2 | | 2/2004 | Wilcox | |
| 7,356,413 | B2 | * | 4/2008 | Georgi | G01N 24/081 |
| | | | | | 702/11 |
| 7,905,255 | B2 | | 3/2011 | Iwasaki-Higbee | |
| 8,235,075 | B2 | * | 8/2012 | Saltel | E21B 29/10 |
| | | | | | 138/93 |
| 8,807,172 | B2 | * | 8/2014 | D'Hulster | F16L 55/179 |
| | | | | | 138/97 |
| 9,541,230 | B2 | * | 1/2017 | Tanner | F16L 55/18 |
| 2014/0109560 | A1 | | 4/2014 | Ilievski | |

\* cited by examiner

*Primary Examiner* — Thomas E Lazo
(74) *Attorney, Agent, or Firm* — Neustel Law Offices (57) ABSTRACT

A pipe tool positioning system for efficiently inserting, positioning, and orienting a tool for use within a pipe. The pipe tool positioning system generally includes a sleeve with a receiver opening adapted to receive and removably retain a tool such as a grinder or the like. The sleeve includes radially-offset bladders extending outwardly from its outer surface. Each of the bladders may be individually inflated and/or deflated to aid in positioning of the tool within a pipe. A control unit may be provided with controllers for individually controlling each of the bladders. A camera may also be included adjacent to the sleeve to feed a display included with the control unit. By utilizing the present invention, various tools may efficiently be inserted and positioned for use within a pipe.

10 Claims, 14 Drawing Sheets

PIPE TOOL POSITIONING SYSTEM

CROSS REFERENCE TO RELATED APPLICATIONS

The present application is a continuation of U.S. application Ser. No. 14/461,067 filed on Aug. 15, 2014. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to a tool positioning system and more specifically it relates to a pipe tool positioning system for efficiently inserting, positioning, and orienting a tool for use within a pipe.

Description of the Related Art

Any discussion of the related art throughout the specification should in no way be considered as an admission that such related art is widely known or forms part of common general knowledge in the field.

It is often necessary to utilize a tool such as grinders and the like within pipes such as sewage piping which require maintenance or the trimming of linings within the pipe for an individual to manually utilize the tool. Thus, various aids have been developed to assist with positioning such tools within a pipe.

Current tool positioning systems are very limited and expensive. For example, one such system includes the use of bladders which are fully inflated to expand to the full radius of the pipe or conduit. These types of bladders can block water, fluids, or materials from flowing through the pipe. Another bladder assembly example can expand in certain directions to wedge the tool inside the pipe or conduit to keep the tool from moving but does not have the capability to move the tool in different directions. Another type of bladder assembly moves the tool forward when the bladder is expanded but does not move the tool side to side or up or down inside of the pipe or conduit. Another type of assembly utilizes "soft robotics" but this requires a flexible main body that the bladders are attached to and does not allow the use of standard power tools. There are also bladder assemblies that utilize several metal support legs that are extended and compressed by the rubber bladders to the inside walls of the pipe or conduit to hold it in place for vertical pipes or conduits. This type of bladder assembly makes it difficult to hold the tool in place and may also damage linings inside of pipes and conduits.

Because of the inherent problems with the related art, there is a need for a new and improved pipe tool positioning system for safely and efficiently inserting, positioning, and orienting a tool for use within a pipe.

BRIEF SUMMARY OF THE INVENTION

The invention generally relates to a tool positioning system which includes a sleeve with a receiver opening adapted to receive and removably retain a tool such as a grinder or the like. The sleeve includes radially-offset bladders extending outwardly from its outer surface. Each of the bladders may be individually inflated and/or deflated to aid in the positioning of the tool within a pipe. A control unit may be provided with controllers for individually controlling each of the bladders. A camera may also be included adjacent to the sleeve to feed a display included with the control unit. By utilizing the present invention, various tools may efficiently be inserted and positioned for use within a pipe.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 13 illustrate a pipe tool positioning system 10, which comprises a sleeve 20 with a receiver opening 25 adapted to receive and removably retain a tool 14 such as a grinder or the like. The sleeve 20 includes radially-offset bladders 30, 40, 50 extending outwardly from its outer surface 26. Each of the bladders 30, 40, 50 may be individually inflated and/or deflated to aid in positioning of the tool 14 within a pipe 12. A control unit 70 may be provided with controllers 72, 73, 74 for individually controlling each of the bladders 30, 40, 50. A camera 60 may also be included adjacent to the sleeve 20 to feed a display included with the control unit 70. By utilizing the present invention, various tools 14 may efficiently be inserted and positioned for use within a pipe 12.

B. Sleeve.

As shown throughout the figures, the present invention includes a sleeve 20 which is adapted to receive and retain a tool 14 for positioning within a pipe 12, such as a pneumatic air-fed tool as shown in the figures. The sleeve 20 includes a first end 21, a second end 22, and a receiver opening 25 extending through its body between the first and second ends 21, 22. The first end 21 includes a first opening 23 and the second end 22 includes a second opening 24, with each opening 23, 24 providing access to the internal receiver opening 25.

Figure 1:
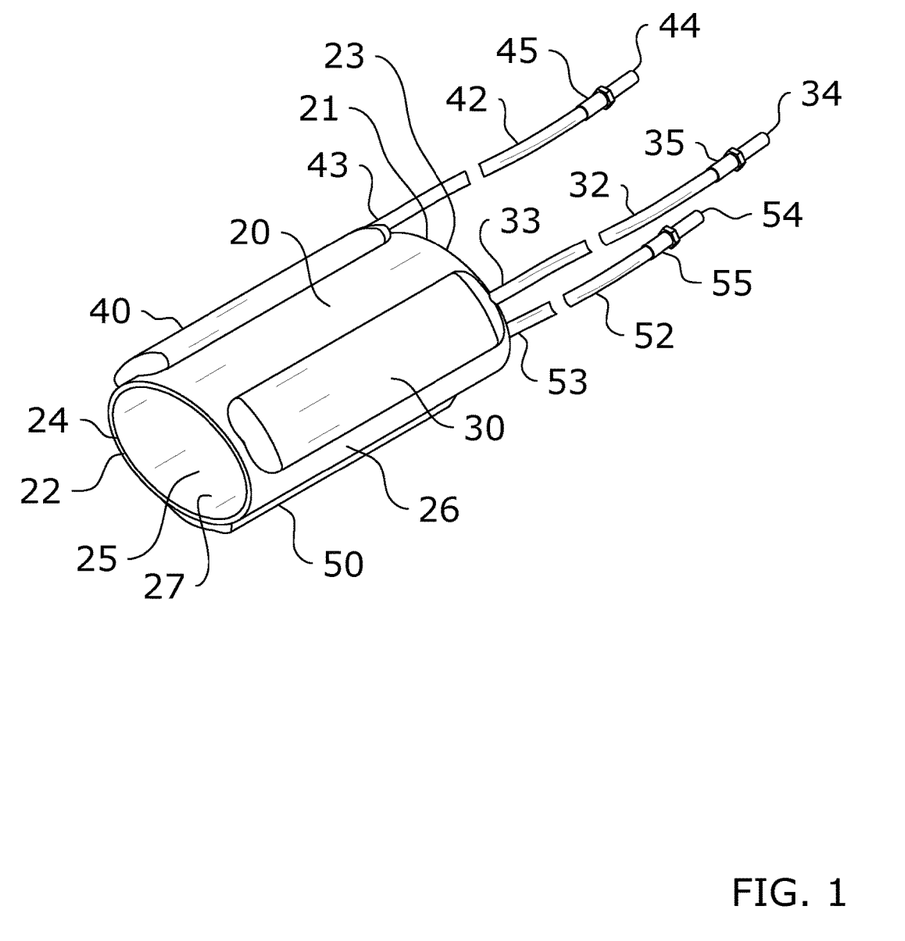
FIG. 1 is an upper perspective view of the sleeve and bladders of the present invention.
Figure 2:
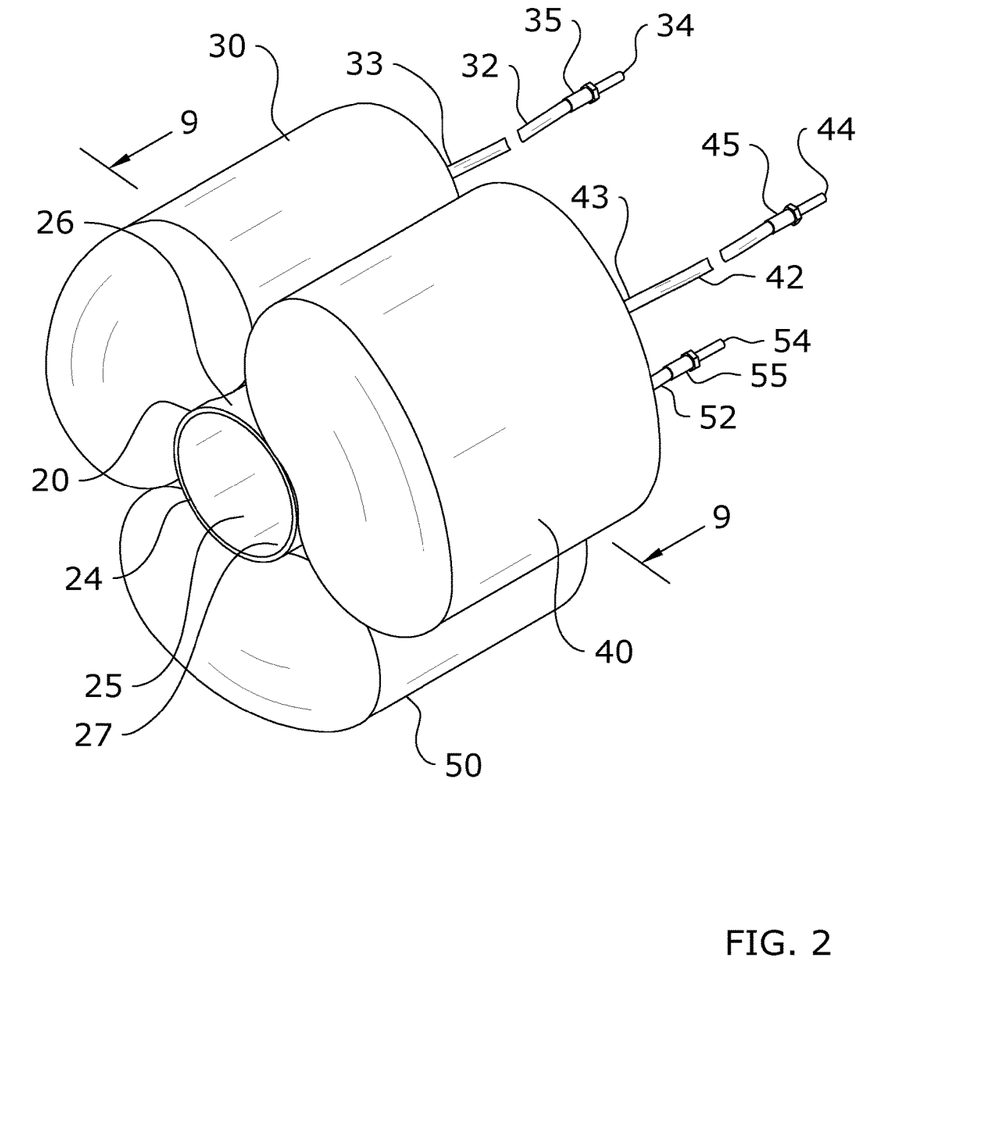
FIG. 2 is an upper perspective view of the sleeve and bladders of the present invention in an inflated state.

The sleeve 20 may be comprised of various shapes, but will generally comprise a substantially cylindrical shape as best shown in FIG. 1. It should be appreciated, however, that any shape may be utilized for the sleeve 20 so long as the sleeve 20 is adapted to retain a tool 14 for positioning within a pipe 12. In some embodiments, the sleeve 20 may not entirely surround the tool 14 such as shown in the figures. Thus, the scope of the present invention should not be construed as being limited by the exemplary figures; particularly with respect to the shape and configuration of the sleeve 20.

In the preferred embodiment shown in the figures, the tool 14 will be secured within the receiver opening 25 of the sleeve 20; with the tool 14 being in contact with and surrounded by the inner surface 27 of the sleeve 20. The outer surface 26 of the sleeve 20 includes the bladders 30, 40, 50 which are utilized for positioning of the tool 14 within the pipe 12.

C. Bladders.

The present invention utilizes a plurality of bladders 30, 40, 50 extending from the outer surface 26 of the sleeve 20 to aid in positioning of the tool 14 within the pipe 12. Each of the bladders 30, 40, 50 are adapted to inflate or deflate in response to the respective addition and/or removal of a fluid. The bladders 30, 40, 50 preferably extend radially from the sleeve 20, with each bladder 30, 40, 50 being radially offset with respect to the other bladders 30, 40, 50. It should also be appreciated that the sleeve 20 and bladders 30, 40, 50 may be integrally formed in some embodiments, or, in other embodiments, the bladders 30, 40, 50 may be connected to the sleeve 20.

The shape, size, and configuration of the bladders 30, 40, 50 may vary in different embodiments of the present invention. In the figures, the bladders 30, 40, 50 are shown in a preferred configuration as elongated, inflatable members each extending between the first and second ends 21, 22 of the outer surface 26 of the sleeve 20. It should be appreciated that a range of fluids, including liquids and gases, may be utilized to inflate the bladders 30, 40, 50. In a preferred embodiment, compressed air will be utilized. However, fluids such as water or other gases may be utilized in some embodiments.

It should be appreciated, however, that other configurations and sizes may be utilized so long as the bladders 30, 40, 50 radially extend from the outer surface 26 of the sleeve 20 to aid in positioning the tool 14 within the pipe 12. It should be appreciated that the bladders 30, 40, 50 may not necessary extend fully along the length of the sleeve 20, but may instead be different sizes for different applications of the present invention.

The number of bladders 30, 40, 50 utilized within the present invention may vary in different embodiments. The number of bladders may be comprised of 2, 3, 4, 5, 6 or more individual bladders. The bladders may also be comprised of a unitary structure having partitions defining each of the individual bladders wherein a valve or similar structure within a divider wall may control the fluid pressure within each of the bladders. In the exemplary embodiment shown in the figures, a first bladder 30, a second bladder 40, and a third bladder 50 are used, with each of the bladders 30, 40, 50 being radially offset from the other bladders 30, 40, 50 in approximately 120 degree increments. Though this is a preferred embodiment in which three bladders 30, 40, 50 are used, it should be appreciated that alternate spacing may be utilized for different applications.

Figure 5:
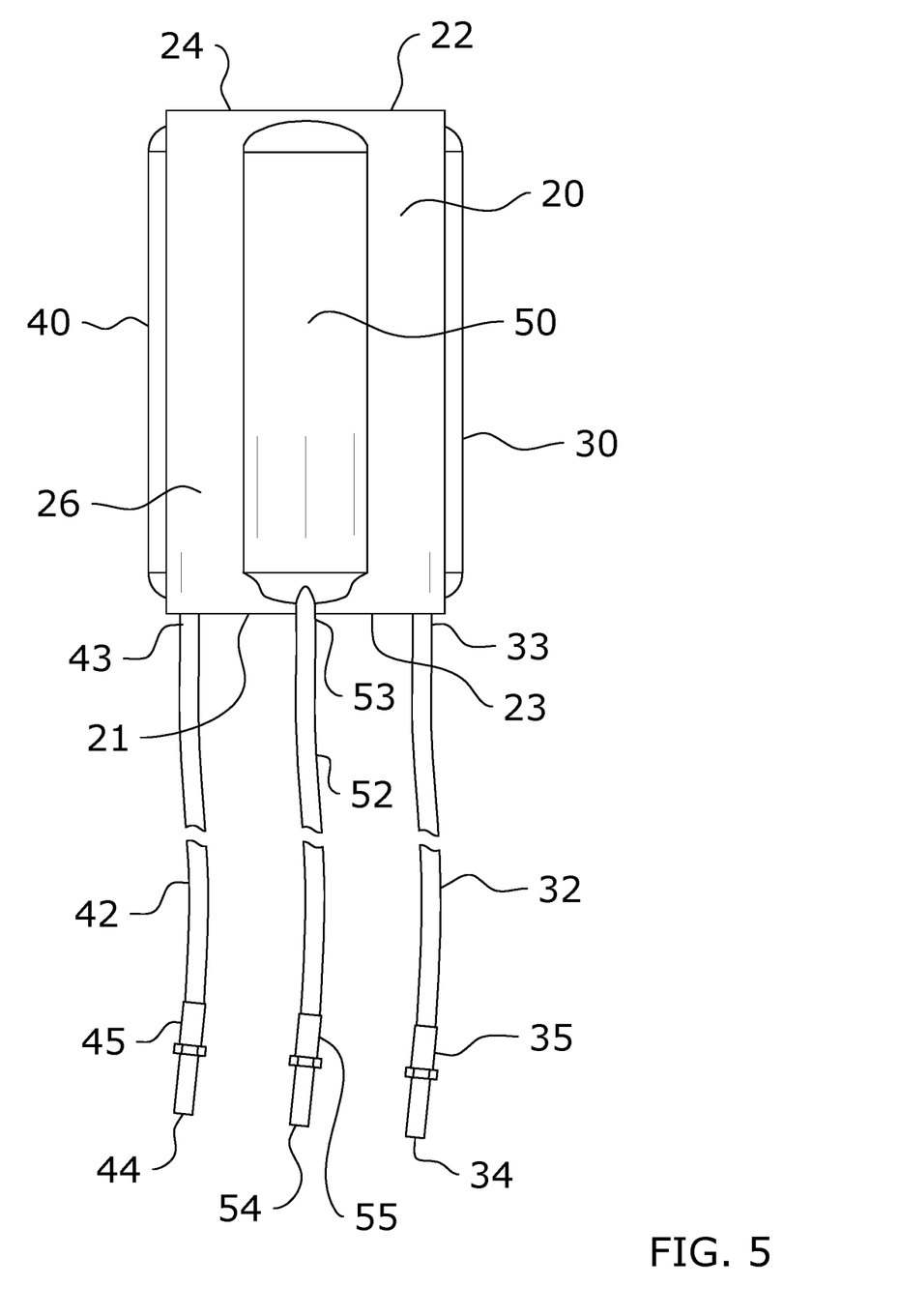
FIG. 5 is a top view of the sleeve and bladders of the present invention.

Each of the bladders 30, 40, 50 are preferably individually controllable through use of its own conduit 32, 42, 52. Thus, the first bladder 30 includes a first conduit 32, the second bladder 40 includes a second conduit 42, and the third bladder 50 includes a third conduit 52. The first ends 33, 43, 53 of each respective conduit 32, 42, 52 are fluidly connected to the respective bladders 30, 40, 50 as best shown in FIG. 5.

Each of the conduits 32, 42, 52 are fluidly connected to the control unit 70 of the present invention. The lengths of the conduits 32, 42, 52 extending from the bladders 30, 40, 50 may vary. In some embodiments, the conduits 32, 42, 52 will be directly connected to the control unit 70, such as via a first connector 35 on the second end 34 of the first conduit 32, a second connector 45 on the second end 44 of the second conduit 42, and a third connector 55 on the second end 54 of the third conduit 52.

The connectors 35, 45, 55 may be comprised of various quick-connect devices known in the art for fluidly connecting a conduit to another conduit or to a port. In some embodiments, the conduits 32, 42, 52 extending from the bladders 30, 40, 50 may be fluidly interconnected with the control unit 70 through additional conduits, valves, and the like, so long as fluid may be continuously fed between the control unit 70 and each of the bladders 30, 40, 50 individually.

In some embodiments, a discrete sleeve 20 may be omitted, with the receiver opening 25 being formed between interconnected bladders 30, 40, 50. In such embodiments, the bladders 30, 40, 50 may be directly connected to each other or may be interconnected by other fabrics or linkages to form the receiver opening 25.

D. Camera.

Figure 12:
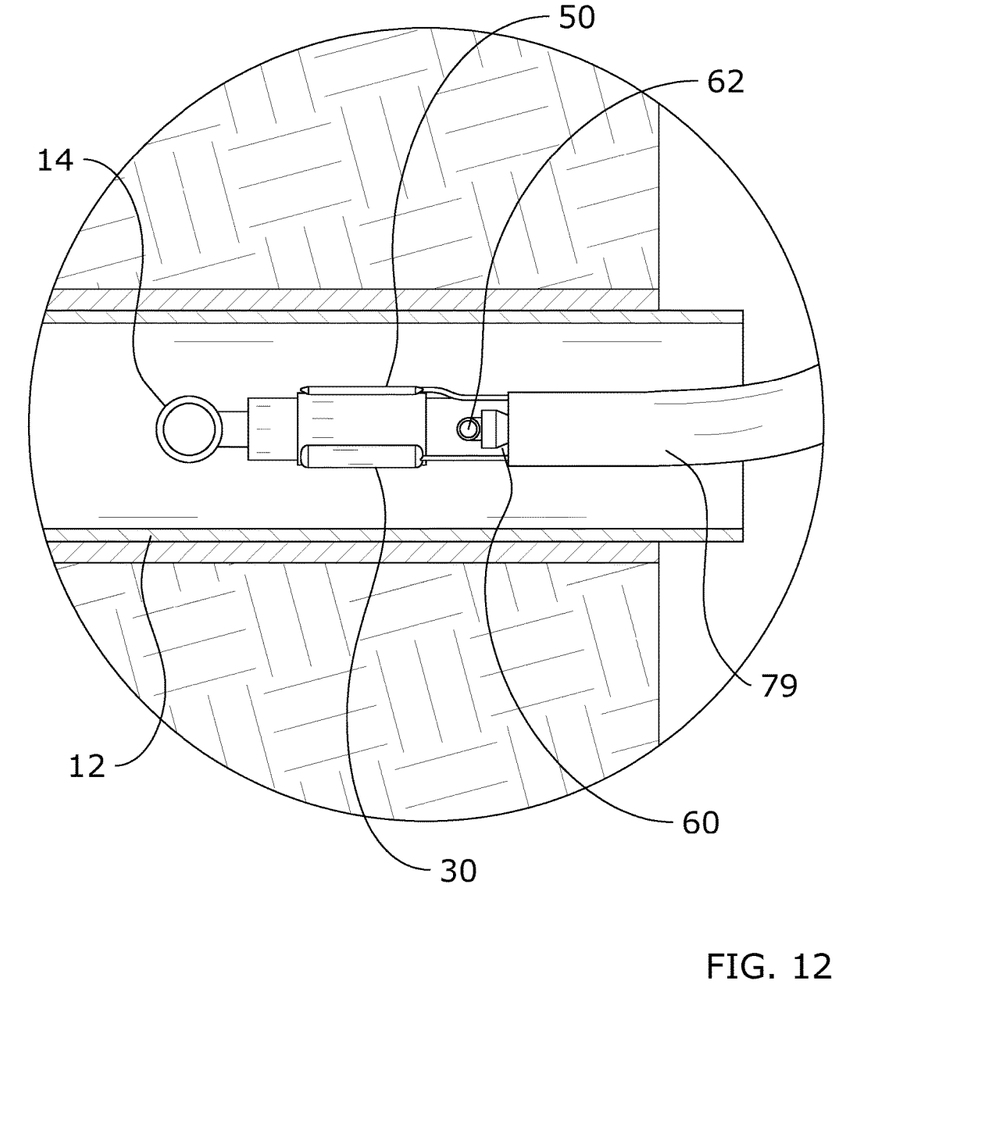
FIG. 12 is a side cutaway view of the present invention being inserted within a pipe.
Figure 13:
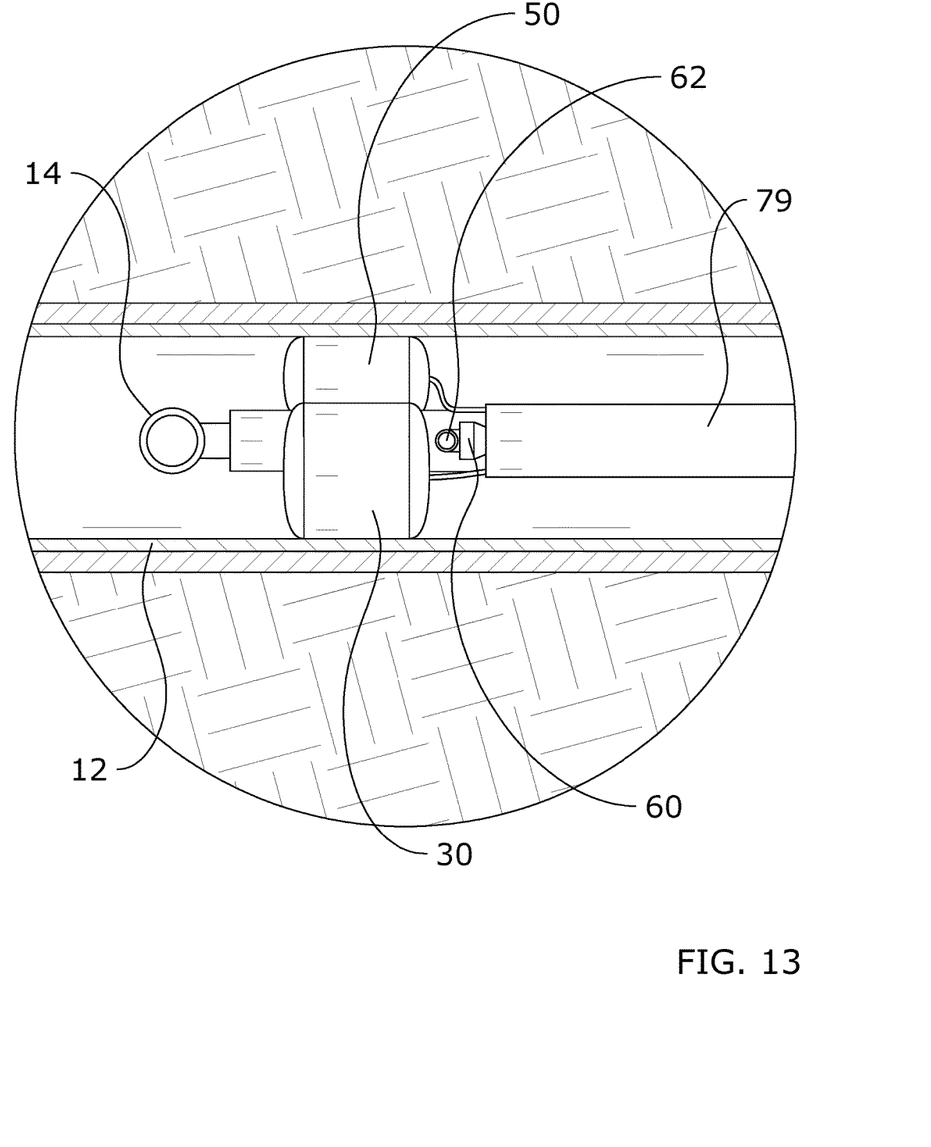
FIG. 13 is a side cutaway view of the present invention positioned within a pipe for use.

As best shown in FIG. 12, the present invention may utilize a camera 60 to aid in positioning and utilizing the tool 14 when it is extended within the pipe 12 through use of the present invention. Various types of cameras 60 may be utilized, though the camera 60 should preferably be adapted to sustain exposure to elements typical within a pipe 12, such as various fluids, chemicals and gasses. A camera cleaner 62 such as a spray jet may also be provided to clean the camera's 60 lens if it becomes dirty during use of the present invention.

The camera 60 may be positioned along various locations of the present invention. In a preferred embodiment as shown in the figures, the camera 60 is positioned at the distal end of the outer tubing 79 which extends from the control unit 70. The camera 60 is preferably oriented to have its lens point along the outer surface 26 of the sleeve 20 between bladders 30, 40, 50 so that the view of the camera 60 is not impeded by the bladders 30, 40, 50.

The camera 60 may be operated wirelessly or through a wired configuration. In a wired configuration, the wiring from the camera 60 may extend through the outer tubing 79 to be connected to the control unit 70. The feed from the camera 60 will preferably be viewable upon a display 71 included with the control unit 70, though in some embodiments the camera 60 feed may be transmitted wirelessly to other devices, such as tablets, computers, notebooks, or smart phones.

E. Control Unit.

The present invention generally includes a control unit 70 for controlling the various functionalities of the present invention. The configuration and complexity of the control unit 70 may vary in different embodiments. In a simplified embodiment of the present invention, the control unit 70 may simply be comprised of an air pump 80 directly connected to the bladders 30, 40, 50.

Figure 10:
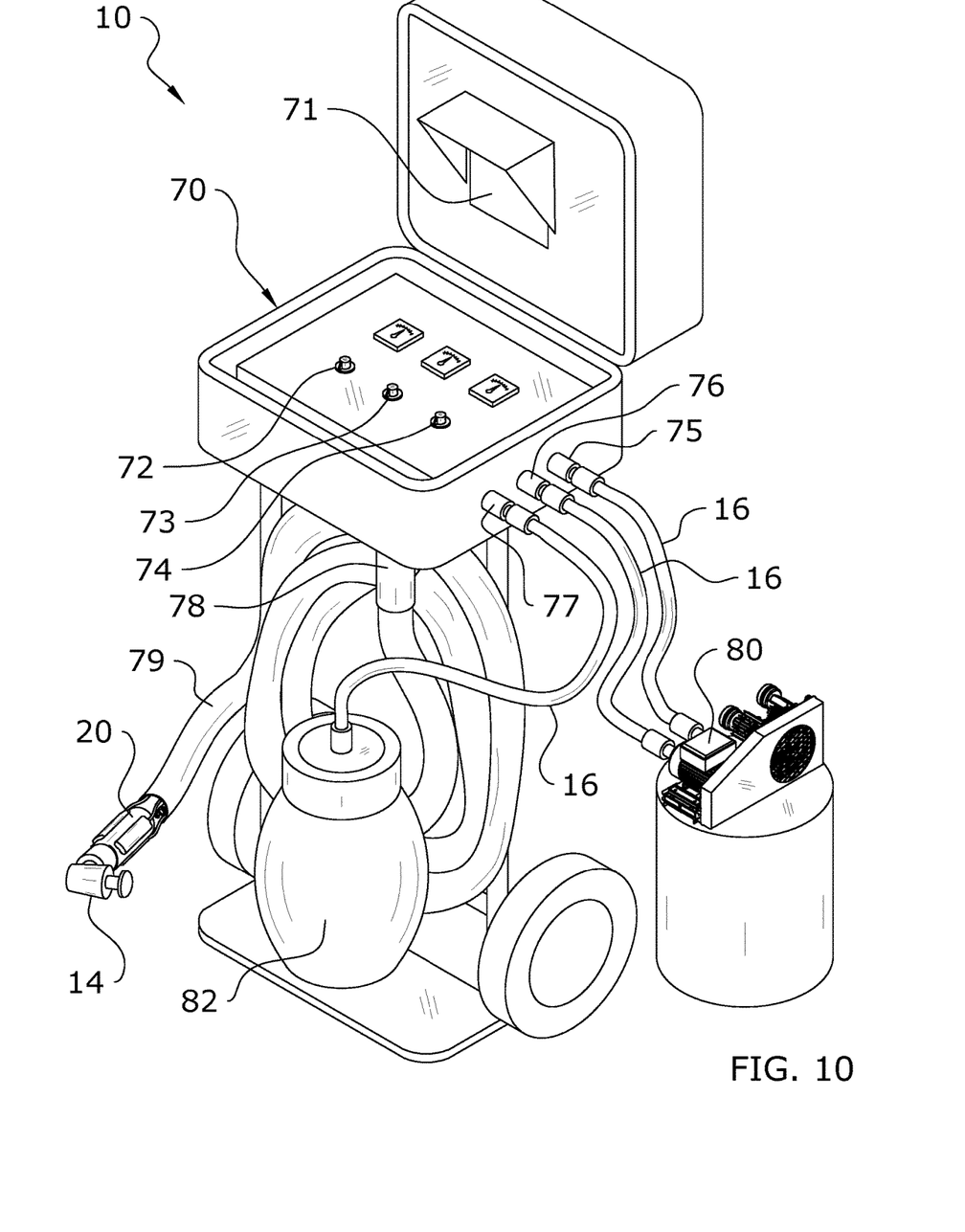
FIG. 10 is an upper perspective view of the present invention.

In a preferred embodiment as best shown in FIG. 10, the control unit 70 will comprise an easily transportable device such as a case. An optional stand may be provided for the control unit 70 to rest on for use, or the control unit 70 may be placed on any elevated surface or the ground. The control unit 70 may include a display 71 for viewing the camera 60 while the present invention is in operation.

The control unit 70 will preferably include one or more controls 72, 73, 74 for controlling individual operation of each bladder 30, 40, 50. In the embodiment best shown in FIG. 10, a first controller 72 controls the first bladder 30, a second controller 73 controls the second bladder 40, and a third controller 74 controls the third bladder 50. While analog controls are shown, in some embodiments digital controls may be utilized. Additionally, wireless operation may be utilized, such as through usage of a smart phone or other device.

The control unit 70 may act as a hub for the various other components of the present invention such as shown in FIG. 10. The control unit 70 may include one or more input ports 75, 76, 77 which may be utilized to connect the control unit 70 to various other devices, such as an air pump 80 or fluid reservoir 82.

In a preferred embodiment as shown in FIG. 10, the control unit 70 includes a tool flow port 75 for fluid flow to the tool 14, a bladder flow port 76 for fluid flow to the bladders 30, 40, 50, and a spray flow port 77 for fluid flow to the camera cleaner 62. In such an embodiment, the tool and bladder flow ports 75, 76 may be connected to one or more air pumps 80 via one or more port conduits 16 and the spray flow port 77 may be connected to a fluid reservoir 82 via one or more port conduits 16.

The control unit 70 may also include an outlet port 78 such as shown in FIG. 10. An outer tubing 79 may be connected to the outlet port 78 through which various conduits 32, 42, 52 of the present invention may extend. The outer tubing 79 will protect these conduits 32, 42, 52 from exposure along the majority of their lengths. The outer tubing 79 will also protect any wiring extending to the camera 60, any flow conduits leading to the camera cleaner 62, as well as any cord or conduits extending from the tool 14 itself.

F. Operation of Preferred Embodiment.

In use, the control unit 70 is first oriented at or near an entry point for the pipe 12 to be serviced. Various types of pipes 12 may be serviced, such as CIPP cured-in-place pipe lining, utility piping and conduits, sewer, drain, water, fire suppression, pressure, industrial, petroleum, electrical, heating, or cooling pipes, as well as HVAC duct work and the like.

Figure 6:
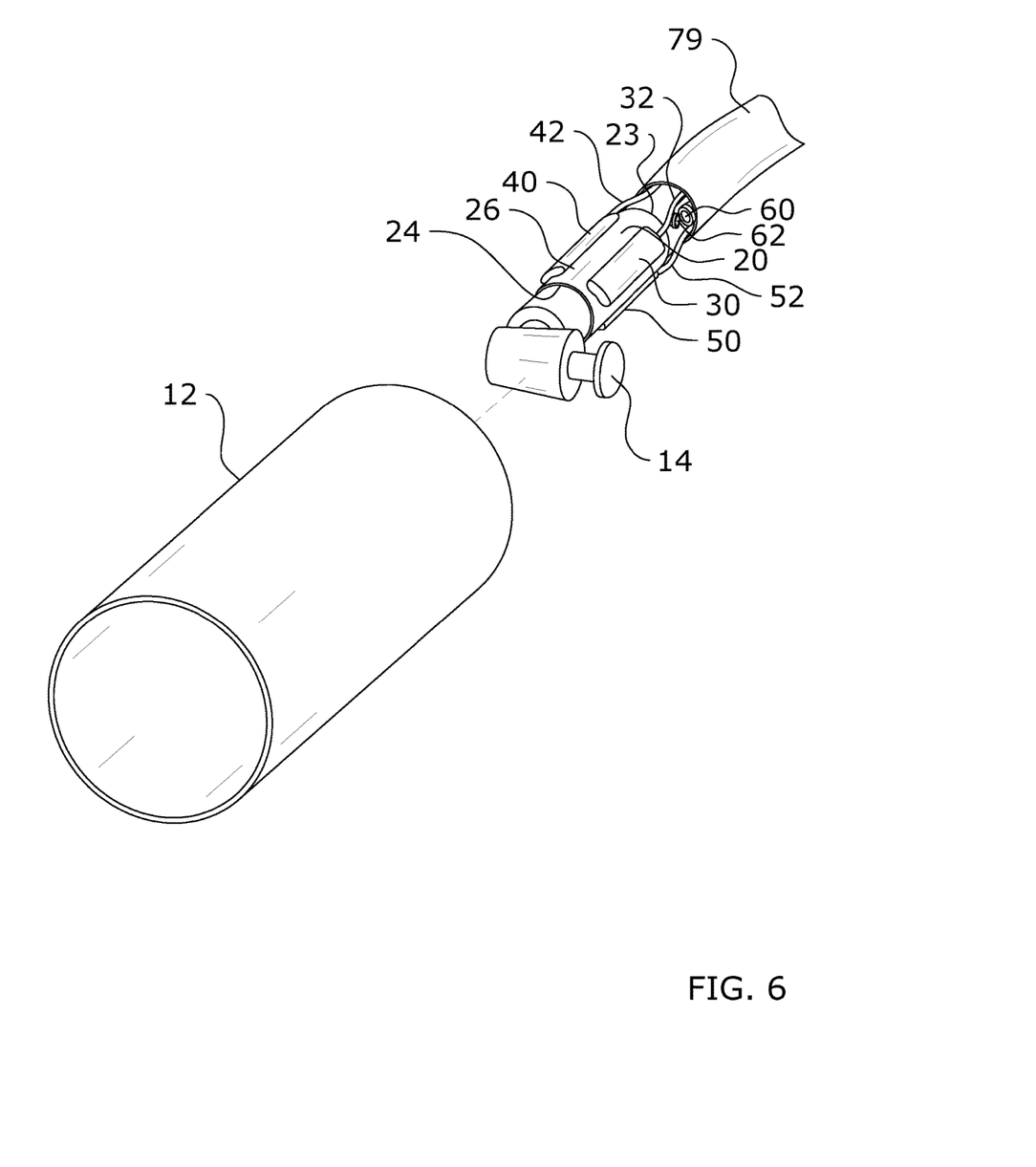
FIG. 6 is an upper perspective view illustrating the aligning of a tool within a sleeve for insertion within a pipe.

As shown in FIG. 6, a tool 14 may be positioned within the receiver opening 25 of the sleeve 20. The present invention may be utilized with a wide range of tools 14, such as CIPP lining reinstatement cutters, pipe and conduit inspection cameras, air tools and electric tools such as drills, grinders, saws, reciprocators, UV lights, grouting devices, painting devices, caulkers, and sealing systems.

Figure 3A:
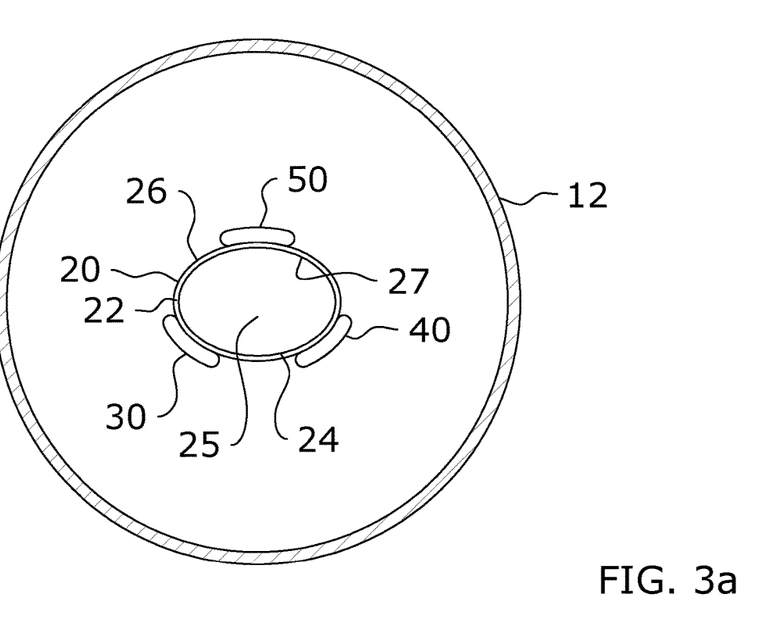
FIG. 3a is a frontal cutaway view of a sleeve with uninflated bladders being inserted through a pipe.
Figure 11A:
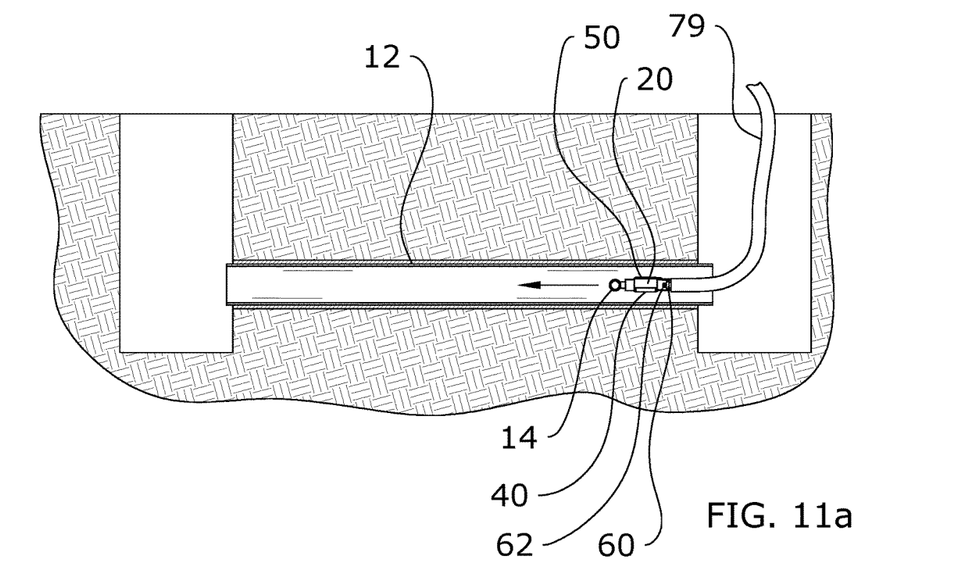
FIG. 11a is a side cutaway view of the present invention being inserted within a pipe.
Figure 11B:
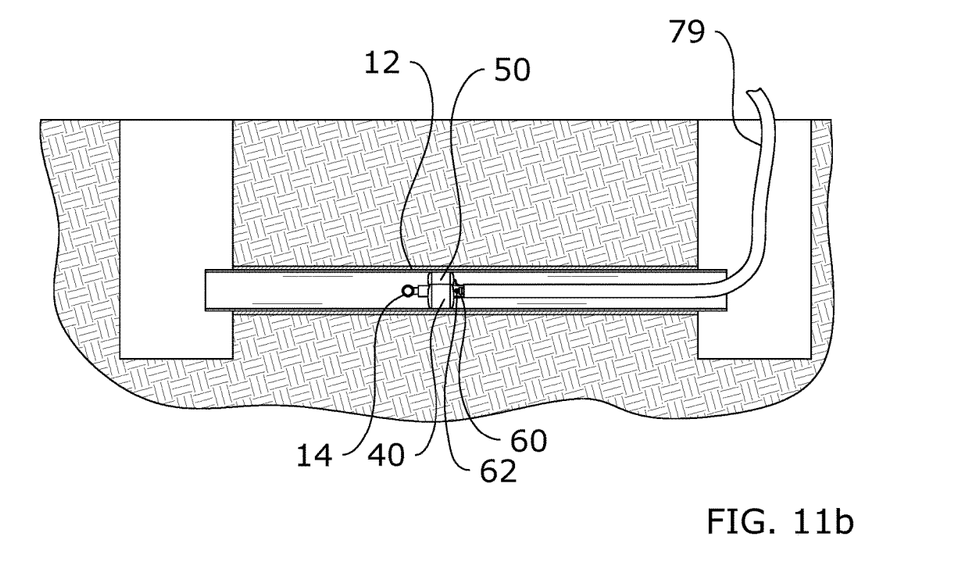
FIG. 11b is a side cutaway view of the present invention positioned within a pipe for use.

Once the tool 14 is secured within the receiver opening 25, it may be inserted through the pipe 12 as shown in FIGS. 11a and 11b. As the tool 14 within the sleeve 20 traverses the pipe 12, the camera 60 may be utilized to view the location of the tool 14 and locate the desired stopping point for use of the tool 14. When in position as shown in FIGS. 3a and 12, the bladders 30, 40, 50 may be manipulated using the control unit 70 to ensure proper positioning of the tool 14 prior to use.

Figure 3B:
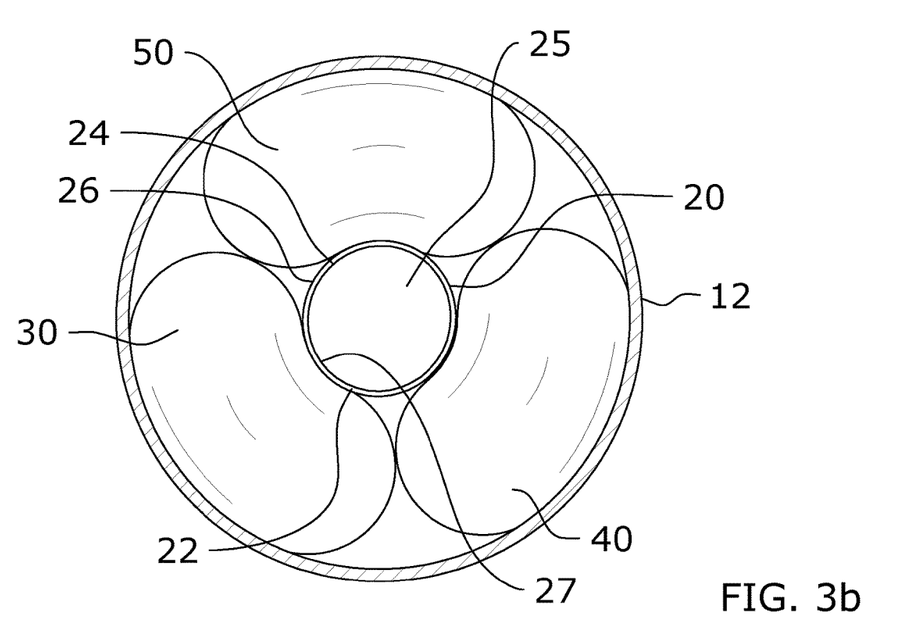
FIG. 3b is a frontal cutaway view of a sleeve with inflated bladders positioned within a pipe.
Figure 3C:
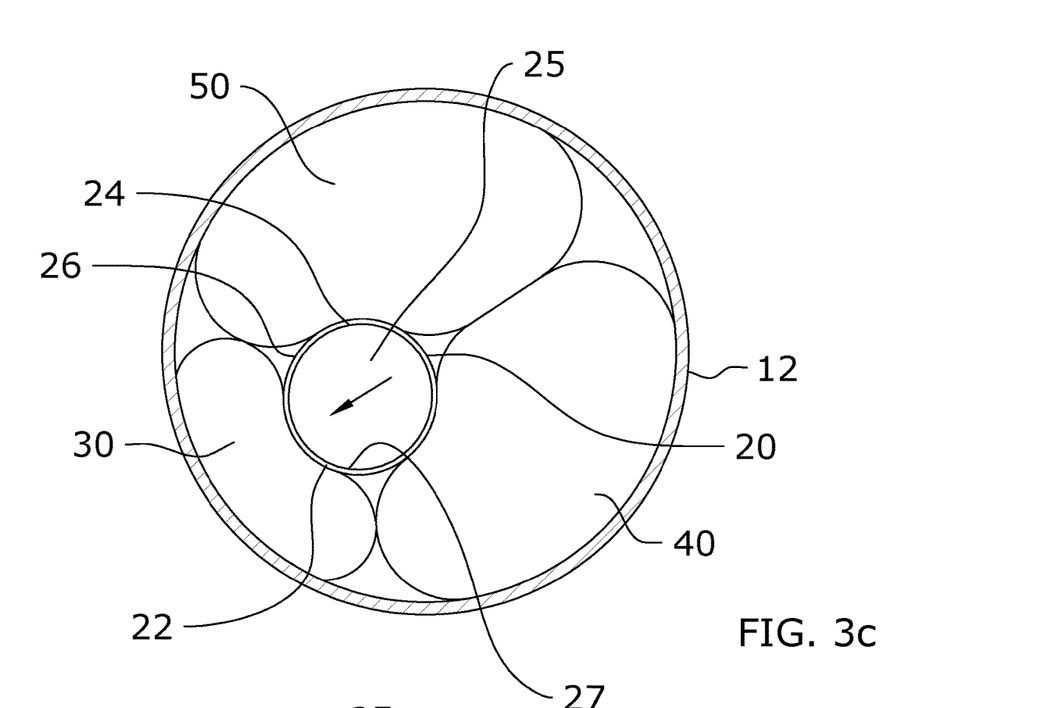
FIG. 3c is a first frontal cutaway view of a sleeve with non-uniformly inflated bladders for positioning a tool within a pipe.
Figure 3D:
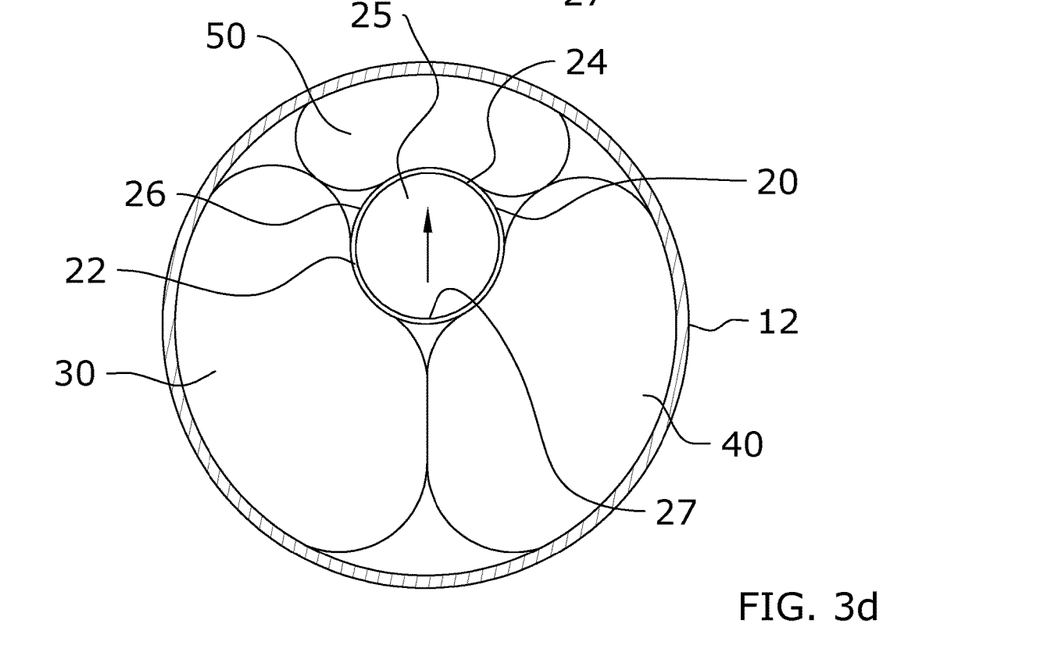
FIG. 3d is a second frontal cutaway view of a sleeve with non-uniformly inflated bladders for positioning a tool within a pipe.
Figure 4:
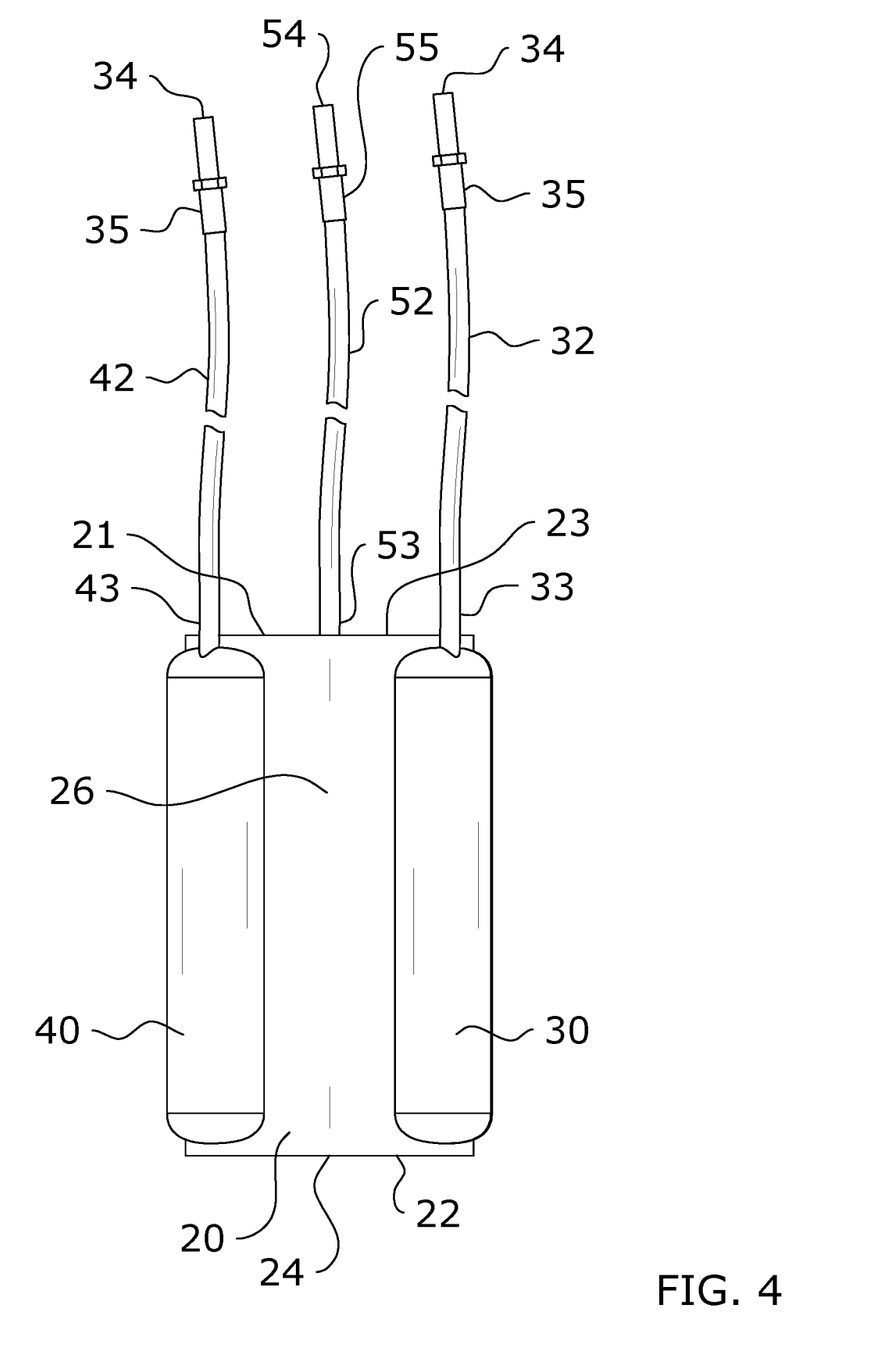
FIG. 4 is a bottom view of the sleeve and bladders of the present invention.
Figure 7:
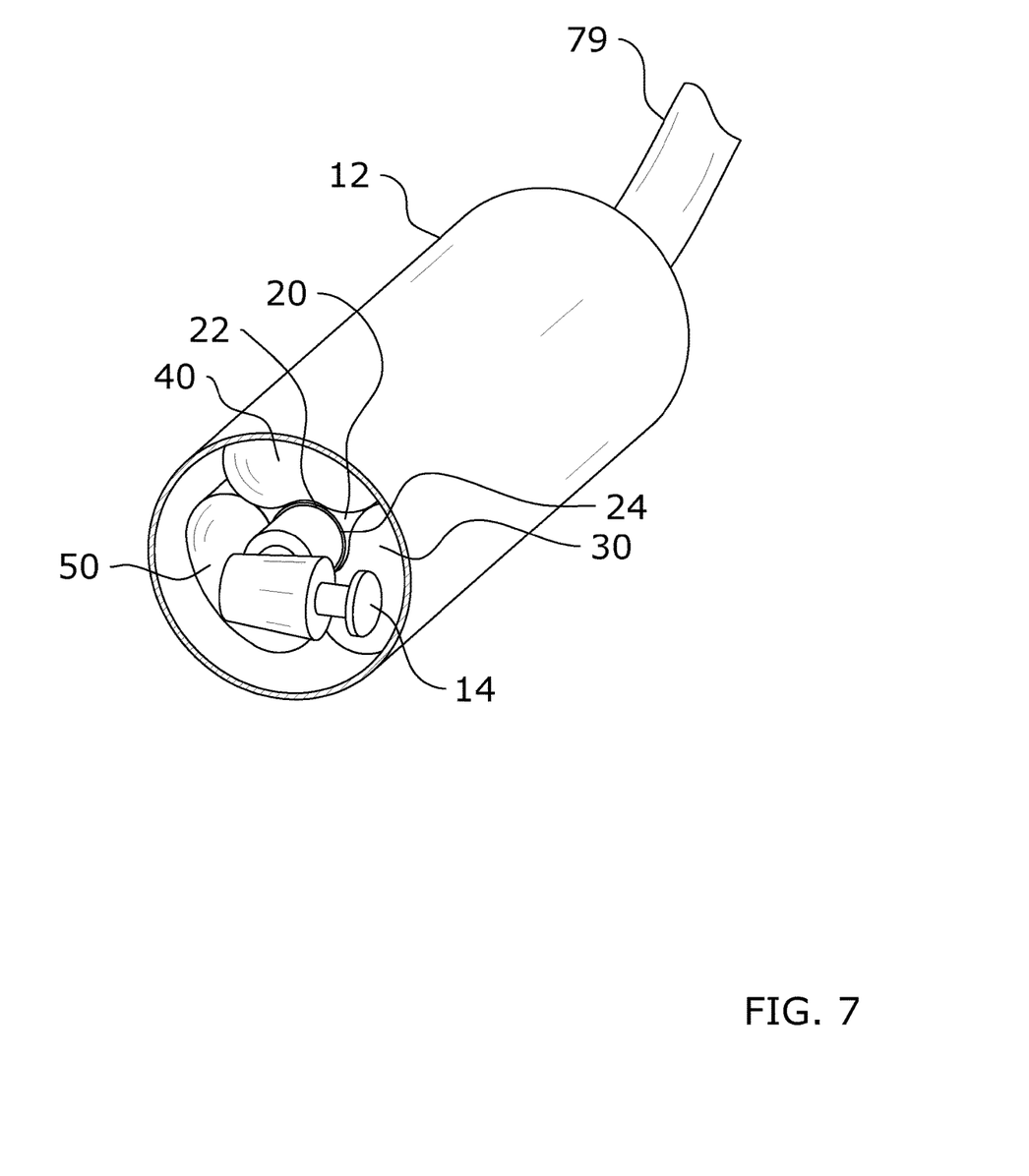
FIG. 7 is an upper perspective view of a tool being positioned within a pipe using the present invention.

As shown in FIGS. 3b and 7, the bladders 30, 40, 50 may be inflated to retain the tool 14 in position within the pipe 12. Each of the bladders 30, 40, 50 may be individually inflated or deflated using the control unit 70 so as to ensure proper orientation of the tool 14 for use, such as shown in FIGS. 3c and 3d.

Figure 8:
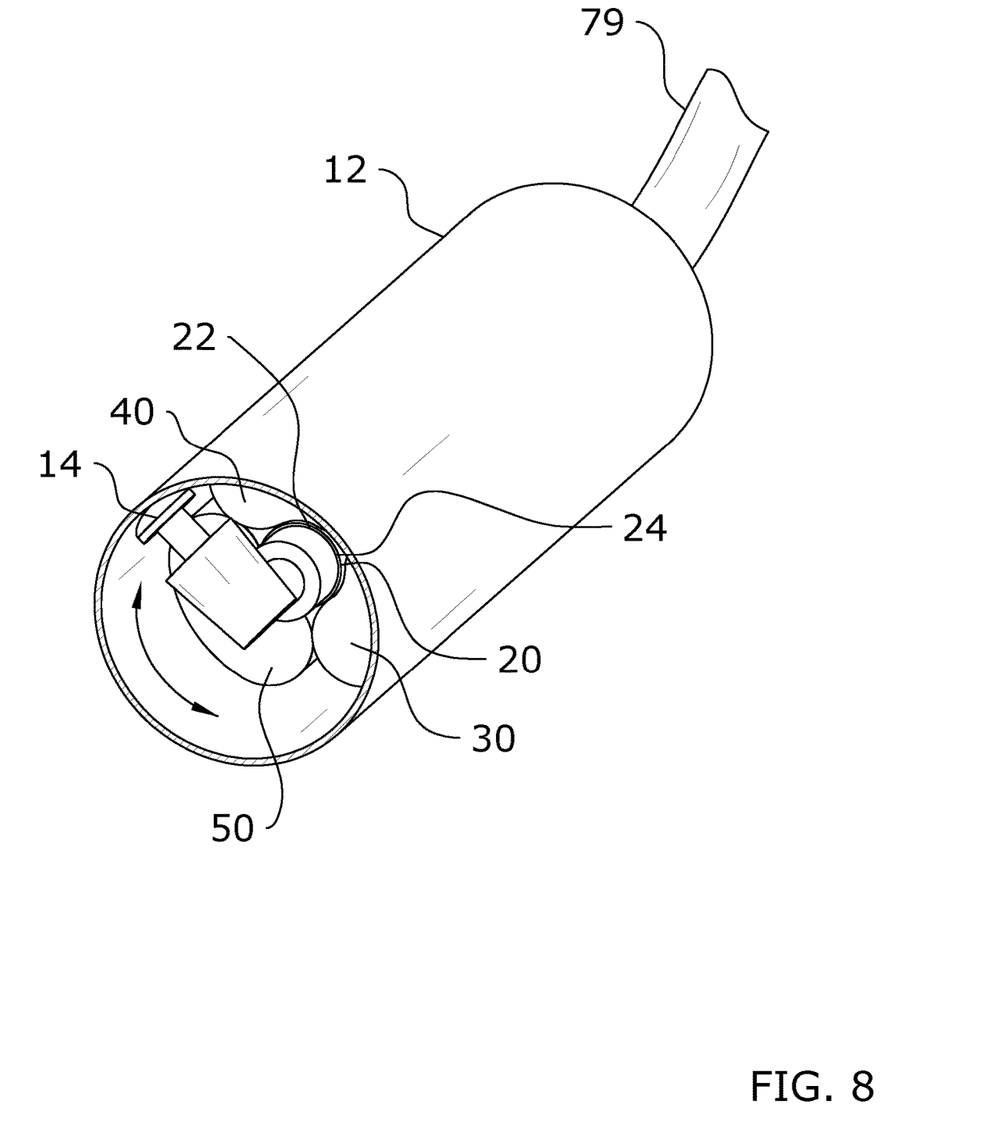
FIG. 8 is an upper perspective view of a tool being used within a pipe.
Figure 9:
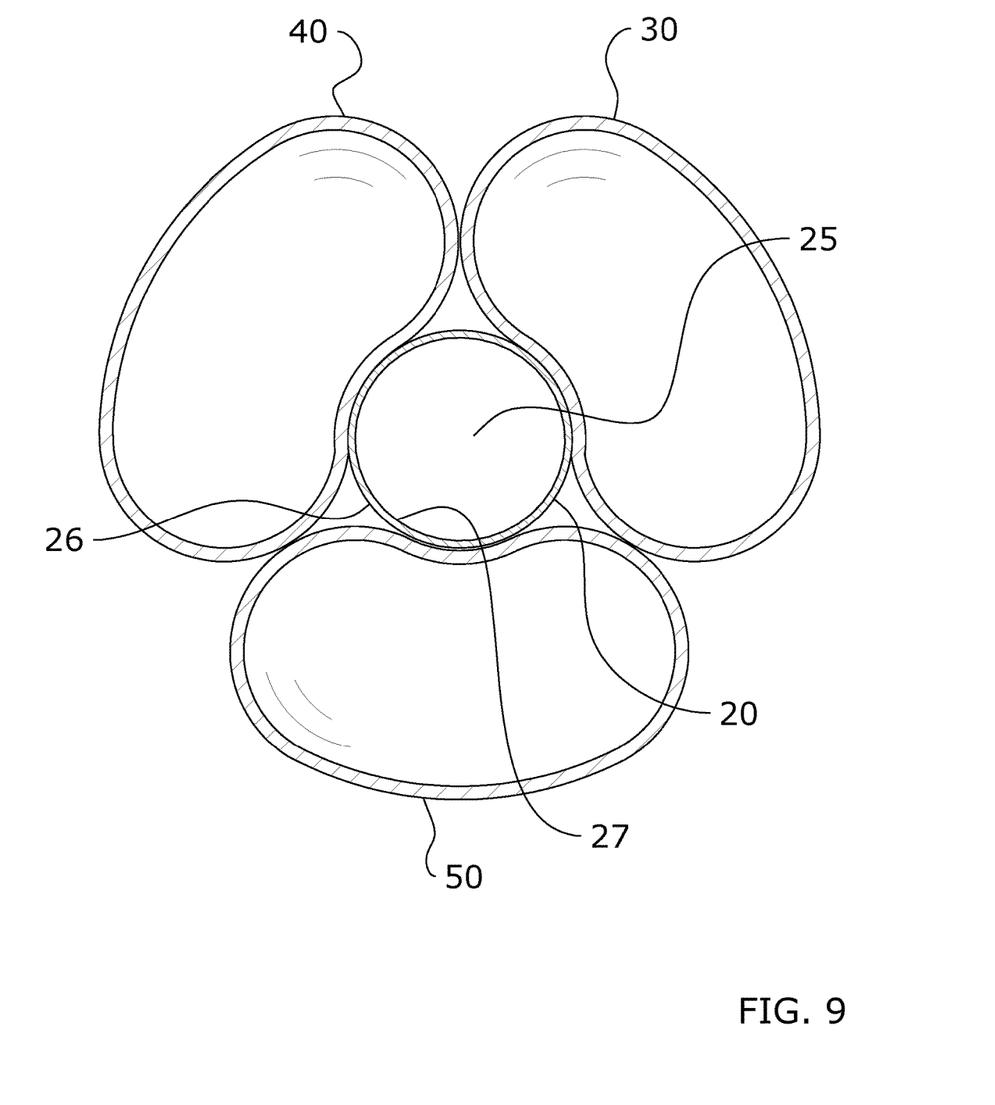
FIG. 9 is a frontal sectional view of the sleeve and bladders of the present invention.

When properly oriented, the tool 14 may be used such as shown in FIG. 8. If movement of the tool 14 is necessary for use, such as in the case of a grinder, the bladders 30, 40, 50 may be manipulated to cause such motion or the cord or the outer tubing 79 extending from the tool 14 may in some cases be manipulated above-grade. When work is completed, the bladders 30, 40, 50 may be deflated and the sleeve 20 and tool 14 may be retracted from the pipe 12 and stored for future use.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A pipe tool positioning system, comprising:
   a sleeve having a receiver opening, wherein said receiver opening is adapted to receive a tool;
   a plurality of bladders extending outwardly from the sleeve;
   at least one conduit fluidly connected to said plurality of bladders to provide a pressurized fluid to said plurality of bladders.

2. The pipe tool positioning system of claim 1, wherein the fluid is comprised of a gas.

3. The pipe tool positioning system of claim 1, wherein the plurality of bladders are comprised of a first bladder, a second bladder, and a third bladder, wherein the first bladder, the second bladder, and the third bladder are radially offset with respect to each other.

4. The pipe tool positioning system of claim 1, further comprising a control unit, wherein the plurality of bladders are each fluidly interconnected with the control unit.

5. The pipe tool positioning system of claim 4, wherein the one or more conduits are comprised of a first conduit, a second conduit, and a third conduit, wherein the first conduit fluidly connects the first bladder with the control unit, wherein the second conduit fluidly connects the second bladder with the control unit, and wherein the third conduit fluidly connects the third bladder with the control unit.

6. The pipe tool positioning system of claim 4, wherein the control unit is adapted to individually control each of the bladders by selectively directing flow of the fluid through one or more of the conduits.

7. The pipe tool positioning system of claim 4, wherein the control unit includes a first controller for the first bladder, a second controller for the second bladder, and a third controller for the third bladder.

8. The pipe tool positioning system of claim 4, wherein the control unit includes a plurality of controllers, each of the controllers being adapted to control airflow to one of the plurality of bladders.

9. The pipe tool positioning system of claim 4, wherein the control unit includes a tool flow port, a bladder flow port, and a spray jet flow port.

10. The pipe tool positioning system of claim 4, further comprising a camera positioned adjacent to the sleeve.

* * * * *